(12) United States Patent
Plet et al.

(10) Patent No.: US 12,134,463 B2
(45) Date of Patent: Nov. 5, 2024

(54) AIRCRAFT COMPRISING A MAIN LANDING GEAR COMPARTMENT WITH A BODY WHICH IS PRODUCED IN A SINGLE PIECE

(71) Applicants: Airbus Operations SAS, Toulouse (FR); Airbus Atlantic SAS, Rochefort (FR)

(72) Inventors: Matthieu Plet, Toulouse (FR); Laurent Dubreuil, Colomiers (FR); Alain Prudent, Colomiers (FR); Xavier Matheis, Toulouse (FR); Gilles Andrieu, Colomiers (FR); Damien Desgaches, Colomiers (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 85 days.

(21) Appl. No.: 17/941,075

(22) Filed: Sep. 9, 2022

(65) Prior Publication Data
US 2023/0079075 A1 Mar. 16, 2023

(30) Foreign Application Priority Data
Sep. 13, 2021 (FR) ...................................... 2109585

(51) Int. Cl.
*B64C 25/14* (2006.01)
*B64C 25/04* (2006.01)

(52) U.S. Cl.
CPC .............. *B64C 25/14* (2013.01); *B64C 25/04* (2013.01)

(58) Field of Classification Search
CPC ................................ B64C 25/04; B64C 25/14
See application file for complete search history.

(56) References Cited

U.S. PATENT DOCUMENTS

| 8,302,910 B2 | 11/2012 | Klug et al. |
| 11,649,033 B2 * | 5/2023 | Vukosav .................. B64C 1/18 244/119 |

(Continued)

FOREIGN PATENT DOCUMENTS

FR 2969119 A1 * 6/2012 ............. B64C 1/068

OTHER PUBLICATIONS

Machine translation of FR-2969119-A1, Gouarderes, Jun. 22, 2012 (Year: 2012).*
French Search Report; priority document.

*Primary Examiner* — Tien Q Dinh
*Assistant Examiner* — Katherine June Bolek
(74) *Attorney, Agent, or Firm* — Greer, Burns & Crain, Ltd.

(57) ABSTRACT

An aircraft including a main landing gear compartment which comprises a rear transverse wall, and a base wall forming a sealed barrier between a first, pressurized area and a second, non-pressurized area. The main landing gear compartment includes a body, produced in a single piece from composite material, separating the first, pressurized area and the second, non-pressurized area. The body includes a first part corresponding to the base wall, as well as a second part corresponding to the rear transverse wall. At least two longitudinal beams made of composite material, are connected to the body. This single body makes it possible to eliminate a large number of parts, to simplify the assembly process, and to reduce the duration thereof.

10 Claims, 5 Drawing Sheets

(56) References Cited

U.S. PATENT DOCUMENTS

| | | | |
|---|---|---|---|
| 11,787,523 B2* | 10/2023 | Vukosav | ............... B64C 1/064 244/120 |
| 2008/0173765 A1 | 7/2008 | Muller et al. | |
| 2014/0151500 A1 | 6/2014 | Bellet et al. | |
| 2019/0112034 A1 | 4/2019 | Bellet et al. | |
| 2019/0112035 A1 | 4/2019 | Bellet et al. | |

* cited by examiner

AIRCRAFT COMPRISING A MAIN LANDING GEAR COMPARTMENT WITH A BODY WHICH IS PRODUCED IN A SINGLE PIECE

CROSS-REFERENCES TO RELATED APPLICATIONS

This application claims the benefit of the French patent application No. 2109585 filed on Sep. 13, 2021, the entire disclosures of which are incorporated herein by way of reference.

FIELD OF THE INVENTION

The present application relates to an aircraft comprising a main landing gear compartment with a body which is produced in a single piece.

BACKGROUND OF THE INVENTION

As illustrated in FIGS. 1 and 2, an aircraft 10 comprises a fuselage 12 which extends between a front point 14 and a rear cone 16, as well as wings 18 which are positioned on both sides of the fuselage 12, and are connected thereto by a central wing spar 20. According to one configuration, the central wing spar comprises a rear panel 20.1, an upper panel 20.2, a front panel 20.3, as well as a lower panel 20.4.

In the continuation of the description, a longitudinal axis 22 of the aircraft 10 corresponds to the horizontal axis, when the aircraft 10 is on the ground, which axis extends from the front point 14 to the rear cone 16 of the aircraft 10. A longitudinal direction is a direction parallel to the longitudinal axis 22. A longitudinal plane is a horizontal plane comprising an axis which is parallel to the longitudinal axis 22. A vertical median plane is a vertical plane which passes via the longitudinal axis 22. A transverse plane is a plane perpendicular to the longitudinal axis 22.

The aircraft 10 comprises a front landing gear 24 which is positioned in the vicinity of (near) the front point 14, as well as two main landing gear 26, which are positioned on both sides of the fuselage 12 at the rear of the central wing spar 20. Each front or main landing gear 24, 26 is configured to occupy a deployed position, as illustrated in FIG. 1, in which it is positioned outside a gear compartment, as well as a retracted position in which it is positioned in the gear compartment.

As illustrated in FIGS. 2 to 5, the fuselage 12 comprises a main landing gear compartment 28, which is positioned at the rear of the central wing spar 20, and is configured to receive the two main landing gear 26 in the retracted position. This main landing gear compartment 28 comprises a rear transverse wall 30.1, as well as a base wall 30.2 which is connected to the upper panel 20.2 of the central wing spar 20. The main landing gear compartment 28 is closed by a ventral beam 27. The rear transverse wall 30.1 and the base wall 30.2 of the main landing gear compartment 28 form a sealed barrier between a first, pressurized area, in the interior of the fuselage 12 and on the exterior of the main landing gear compartment 28, and a second, non-pressurized area in the interior of the main landing gear compartment 28. As a result of this pressure difference, the rear transverse wall 30.1 and the base wall 30.2 are subjected to strong stresses.

According to one embodiment, the base wall 30.2 comprises a plurality of longitudinal metal beams 32 which are parallel to one another and oriented parallel to the longitudinal direction, and extend from the rear transverse wall 30.1 as far as the central wing spar 20. As a complement, as illustrated in FIG. 5, the base wall 30.2 comprises a plurality of plates, also known as membranes 34, with at least one membrane 34 between each pair of consecutive longitudinal beams. These membranes 34 are connected to the longitudinal beams 32 by a large number of securing elements 36. The membranes 34 are, for example, made of metal in the present configurations.

Each membrane 34 is sufficiently flexible to be able to be deformed in the case of a significant pressure difference on both sides of the membrane 34, as illustrated in FIG. 5.

Taking into account the number of parts to be assembled and securing elements to be put into place, the assembly of the main landing gear compartment 28 is relatively lengthy and tedious. The objective of the present invention is to eliminate some or all of the disadvantages of the prior art.

SUMMARY OF THE INVENTION

For this purpose, a subject of the invention is an aircraft comprising a fuselage with a longitudinal direction as well as a vertical median plane, and comprising, from the front to the rear, a central wing spar, a main landing gear compartment, as well as a section of fuselage, the main landing gear compartment comprising a rear transverse wall connected to the section of fuselage which is positioned at the rear of the main landing gear compartment, as well as a base wall which is connected to the central wing spar, the rear transverse wall and the base wall forming a sealed barrier between a first, pressurized area and a second, non-pressurized area, the aircraft comprising a ventral beam which passes through the main landing gear compartment.

According to the invention, the main landing gear compartment comprises:
  a body, produced in a single piece from composite material, separating the first, pressurized area and the second, non-pressurized area, the body comprising a first part corresponding to the base wall, a second part corresponding to the rear transverse wall, an inner face which is oriented towards the second, non-pressurized area, as well as an outer face which is oriented towards the first, pressurized area;
  at least two longitudinal beams made of composite material, oriented parallel to the longitudinal direction and connected to the body;
  bolster beams which assure the continuity of the ventral beam, the bolster beams being positioned in-line with the longitudinal beams, and being connected to the ventral beam, to the section of fuselage, as well as to the body.

The fact of replacing the multitude of membranes by a single body makes it possible to eliminate a large number of parts, which tends to simplify the assembly process and reduce its duration. In addition, this makes it possible to reduce the number of junctions between the different membranes, thus making it possible to simplify the design of the main landing gear compartment and to improve its strength.

According to another characteristic, the body comprises a third, curved part connecting the first and second parts.

According to another characteristic, the base wall comprises a front edge which is contiguous with the central wing spar, and the rear transverse wall comprises a rear edge which is contiguous with the section of fuselage positioned at the rear of the main landing gear compartment. As a complement, the longitudinal beams, known as the right and left longitudinal beams, are positioned on both sides of the vertical median plane, on the outer face of the body, and each have a first straight section which is placed against the first part of the body, a second straight section which is placed against the second part of the body, as well as a third section connecting the first and second sections, which section is curved and is placed against the third, curved part of the body.

According to another characteristic, the right and left longitudinal beams each have a first end which is connected to the central wing spar, as well as a second end which is connected to the section of fuselage positioned at the rear of the main landing gear compartment, the right and left longitudinal beams being continuous between the first and second ends.

According to another characteristic, each bolster beam comprises a brace. As a complement, the body comprises slots which are in the vicinity of (near), or at, its rear edge, each brace passing through a slot, such that the braces project relative to the inner face of the body, and the bolster beams are positioned supported against the rear edge of the body.

According to another characteristic, each bolster beam comprises a core as well as a sole plate, for each bolster beam the brace and the core being positioned on both sides of the sole plate. As a complement, the slots are positioned relative to the right and left longitudinal beams such that, when the braces pass through the slots, the sole plates are placed against the rear edge of the body, and the cores are placed respectively against the right and left longitudinal beams, and are connected thereto.

According to another characteristic, at least the right and left longitudinal beams extend beyond the front edge of the body, each of their first ends being connected by a fastener to the central wing spar.

According to another characteristic, each fastener comprises:
- at least one sole plate which is placed against the central wing spar and is connected thereto by securing elements;
- at least one core which is integral with the sole plate, and is provided with at least one orifice;
- a connection element for each orifice, passing through the orifice and the right or left longitudinal beam.

According to another characteristic, the main landing gear compartment comprises a sealing barrier which extends along the front edge of the body, the sealing barrier being integral with the body and in contact with the central wing spar.

According to another characteristic, the central wing spar comprises an angle bar which is configured to maintain the sealing barrier placed against the central wing spar and the inner face of the body, at the front edge of the body.

BRIEF DESCRIPTION OF THE DRAWINGS

Other characteristics and advantages will become apparent from the following description of the invention, provided purely by way of example, with reference to the appended drawings in which.

DETAILED DESCRIPTION OF THE PREFERRED EMBODIMENTS

Figure 1:
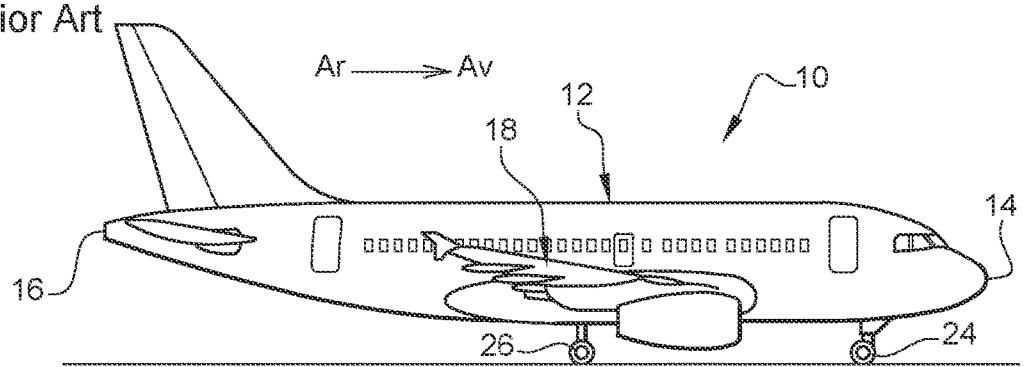
FIG. 1 is a lateral view of an aircraft.
Figure 2:
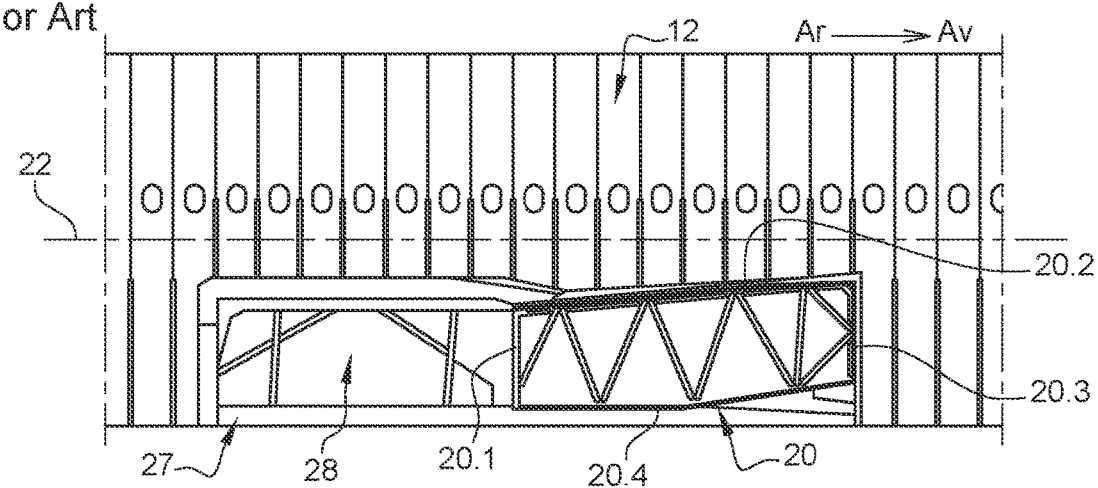
FIG. 2 is a longitudinal cross-section of part of the fuselage of the aircraft shown in FIG. 1.
Figure 3:
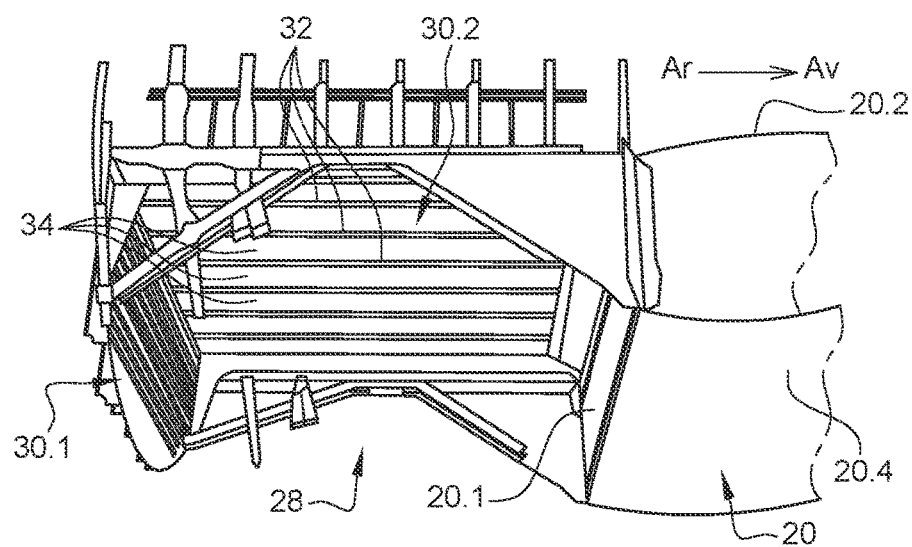
FIG. 3 is a view in perspective of an empty main landing gear compartment illustrating an embodiment according to the prior art.
Figure 4:
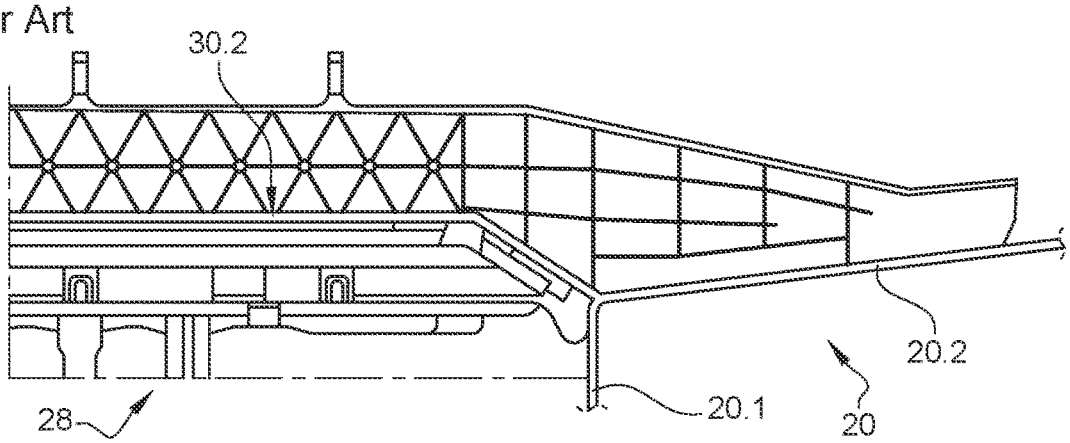
FIG. 4 is a longitudinal cross-section of an empty main landing gear compartment illustrating an embodiment according to the prior art.
Figure 5:
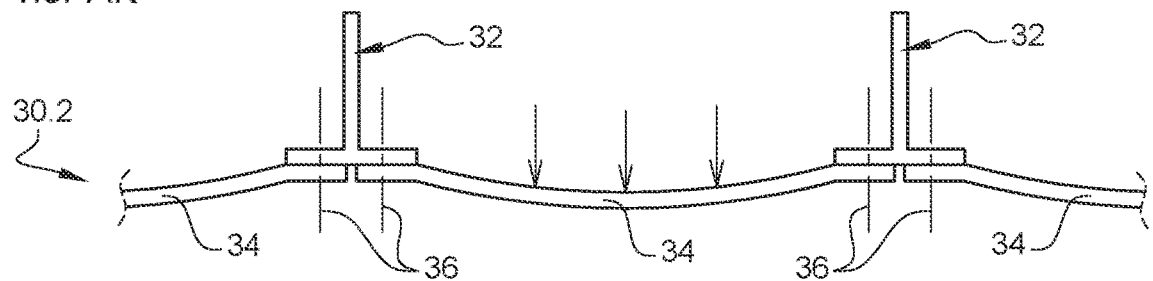
FIG. 5 is a transverse cross-section of an empty main landing gear compartment illustrating an embodiment according to the prior art.
Figure 6:
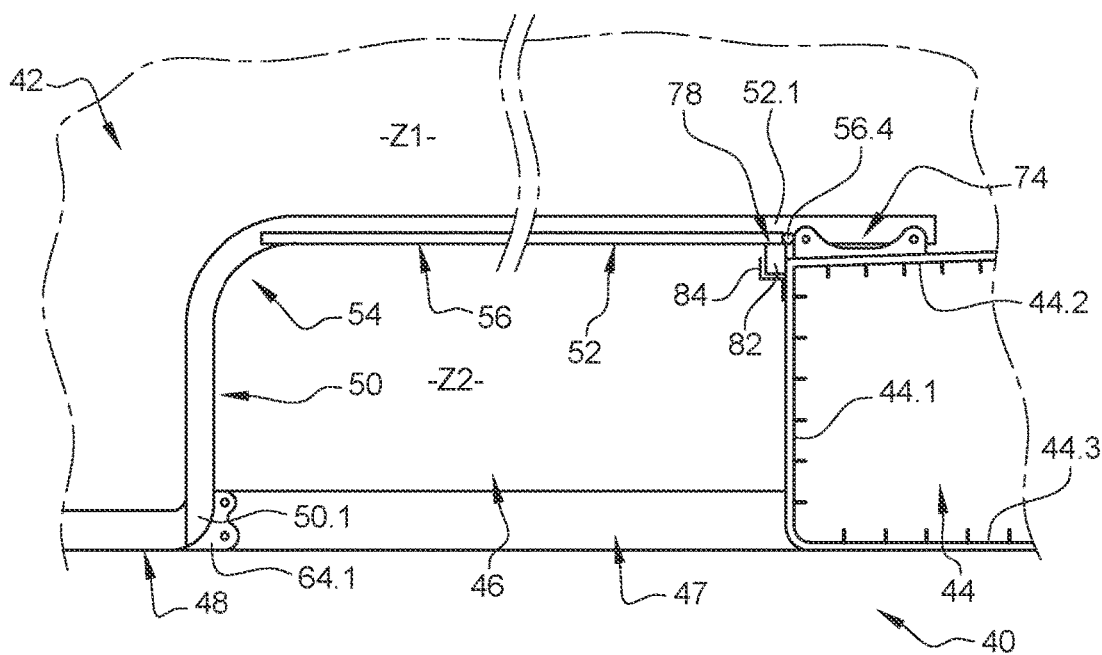
FIG. 6 is a longitudinal cross-section of an empty main landing gear compartment illustrating an embodiment according to the invention.

In FIG. 6, an aircraft 40 comprises a fuselage 42 comprising, from the front to the rear, a central wing spar 44, a main landing gear compartment 46, as well as a section of fuselage 48 positioned at the rear of the main landing gear compartment 46.

According to one embodiment, the central wing spar 44 comprises a rear panel 44.1 positioned on a transverse plane, an upper panel 44.2, a front panel (not represented), as well as a lower panel 44.3. This central wing spar is not described in further detail because it can be identical to those according to the prior art.

The main landing gear compartment 46 comprises a rear transverse wall 50 as well as a base wall 52. The rear transverse wall 50 has a lower edge 50.1 which is connected to the section of fuselage 48 positioned at the rear of the main landing gear compartment 46. The base wall 52 has a front edge 52.1 which is connected to the central wing spar 44. A ventral beam 47 (also known as a keel beam) passes through the main landing gear compartment 46.

The rear transverse wall 50 and the base wall 52 of the main landing gear compartment 46 form a sealed barrier between a first, pressurized area Z1, in the interior of the fuselage 42 and on the exterior of the main landing gear compartment 46, and a second, non-pressurized area Z2 in the interior of the main landing gear compartment 46.

According to one configuration, the rear transverse wall 50 and the base wall 52 are connected by a curved joining area 54, approximately in the form of a quarter of a cylinder, having a horizontal and transverse axis.

According to one characteristic, the main landing gear compartment 46 comprises a body 56, made in a single piece, which separates the first, pressurized area Z1 and the second, non-pressurized area Z2. This body 56 extends over all, or almost all, of the surface of the rear transverse wall 50 and the base wall 52.

The fact of replacing the multitude of membranes by a single body makes it possible to eliminate a large number of parts, to simplify the assembly process, and to reduce the duration thereof.

Figure 7:
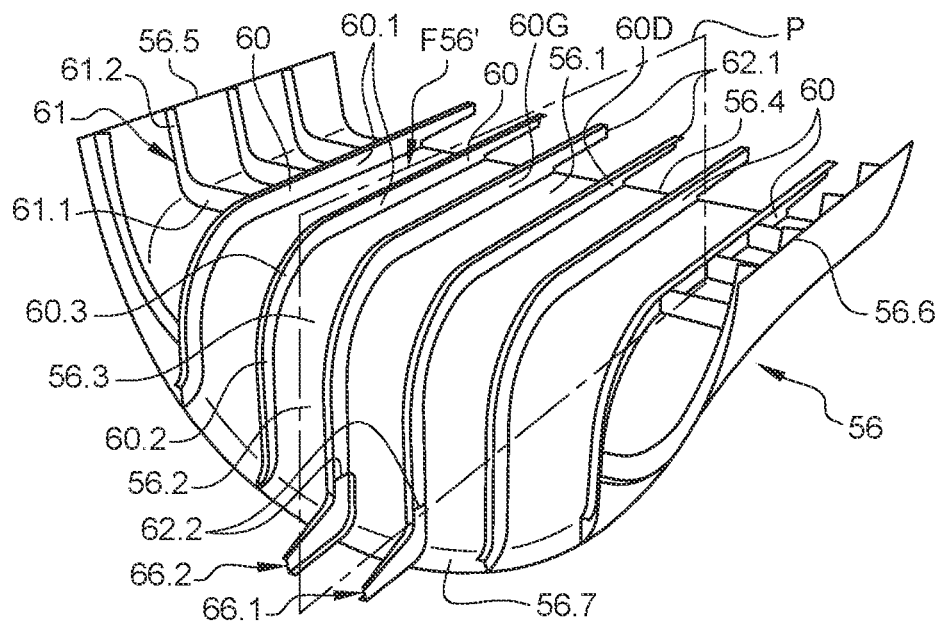
FIG. 7 is a view in perspective, according to a first viewing angle, of a body of a main landing gear compartment illustrating an embodiment according to the invention.
Figure 8:
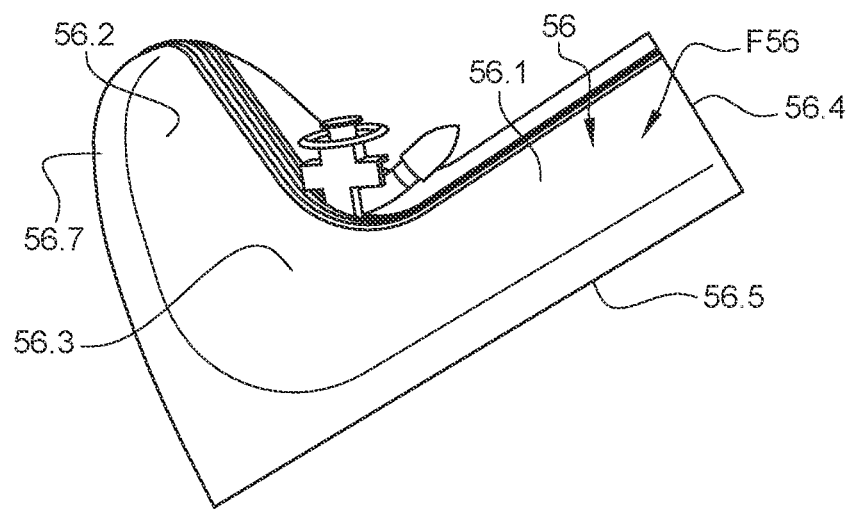
FIG. 8 is a view in perspective of the body shown in FIG. 7, illustrating a method of production of the body.
Figure 9:
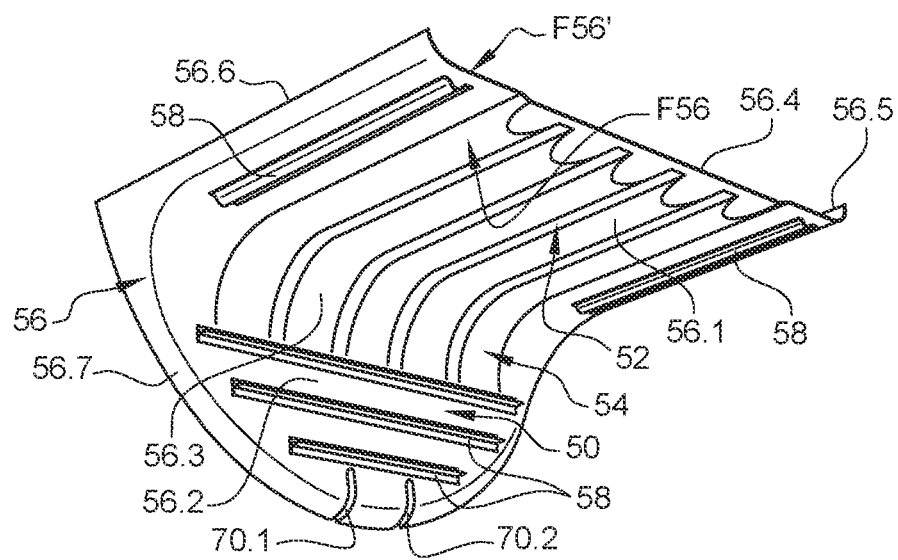
FIG. 9 is a view in perspective, according to a second viewing angle, of the body shown in FIG. 7.

From a geometric point of view, as illustrated in FIGS. 7 to 9, the body 56 comprises a first part 56.1 which is substantially flat and rectangular, corresponding to the base wall 52, a second part 56.2 which is substantially flat, forming a half-disk, and corresponding to the rear transverse wall 50, a third, curved part 56.3, in the form of a quarter of a cylinder, connecting the first and second parts 56.1, 56.2, and corresponding to the joining area 54.

The body 56 also comprises a substantially straight front edge 56.4, which is at the front of the body 56, and is contiguous with the central wing spar 44, two curved, right and left lateral edges 56.5, 56.6, positioned on both sides of the first part 56.1, as well as a curved rear edge 56.7, bordering the second part 56.2, and being contiguous with the section of fuselage 48 which is positioned at the rear of the main landing gear compartment 46.

The body 56 has an inner face F56 which is oriented towards the second, non-pressurized area Z2, as well as an outer face F56', which is opposite the inner face F56, and is oriented towards the first, pressurized area Z1.

The body 56 is substantially symmetrical relative to the vertical median plane P of the fuselage 42.

The body 56 is made of composite material, in particular thermoplastic or thermosetting material.

According to one embodiment, the body 56 is obtained from a structure of fibers embedded in a matrix of thermoplastic or thermosetting resin. The fiber structure is produced from fibers (pre-impregnated with resin or dry) deposited by means of different fiber-depositing techniques, such as a technique of automatic depositing of pre-impregnated strips of fibers known as ATL (Automated Tape Laying) or AFP (Automatic Fiber Placement) for example. This makes it possible to automate the thickness of the body and the stacking of the strips which form it.

According to one configuration, the main landing gear compartment 46 comprises at least one stiffener 58 which is positioned on the inner face F56 of the body 56, and is connected to it by any appropriate technique. The stiffener(s) 58 is/are, for example, in the form of an omega.

In addition to the body 56, the main landing gear compartment 46 comprises at least two longitudinal beams 60, which are oriented parallel to the longitudinal direction, are positioned on the outer face F56' of the body 56, and are connected to the body 56. According to one arrangement, the longitudinal beams 60 are regularly spaced on a transverse plane.

The longitudinal beams 60 are positioned symmetrically relative to the vertical median plane P.

According to one arrangement, the main landing gear compartment 46 comprises a plurality of longitudinal beams 60, including two, right and left longitudinal beams 60D, 60G which are positioned on both sides of the vertical median plane P and are closest thereto.

According to one embodiment, the longitudinal beams 60 are made of thermoplastic or thermosetting composite material. The longitudinal beams 60 can be produced by means of different techniques, such as thermoforming for example. The longitudinal beams 60 are produced in a single piece.

The longitudinal beams 60 are connected to the body 56 by riveting, by welding, or by any other assembly technique.

Irrespective of the embodiment, the main landing gear compartment 46 comprises at least one longitudinal beam 60 made of composite material, which is connected to the body 56 in order to reinforce it.

According to one characteristic, the longitudinal beams 60 extend continuously from the front edge 56.4 of the body 56, which corresponds to the front edge 52.1 of the base wall 52 which is connected to the central wing spar 44, as far as the rear edge 56.7 of the body 56, which corresponds to the lower edge 50.1 of the rear transverse wall 50 which is connected to the section of fuselage 48 positioned at the rear of the main landing gear compartment 46. At least two, right and left longitudinal beams 60D, 60G, positioned on both sides of the vertical median plane P, each have a first straight section 60.1 which is placed against the first part 56.1 of the body 56, a second straight section 60.2, which is placed against the second part 56.2 of the body 56, as well as a third section 60.3 which is curved and connects the first and second sections 60.1, 60.2, and is placed against the third, curved part 56.3 of the body 56.

According to a particular feature, at least the right and left longitudinal beams 60D, 60G each have a first end 62.1 which is connected to the central wing spar 44, as well as a second end 62.2, which is connected to the section of fuselage 48 positioned at the rear of the main landing gear compartment 46, and which beams are continuous between the first and second ends 62.1, 62.2. This configuration assures better transmission of the forces between the central wing spar 44 and the section of fuselage 48 which is positioned at the rear of the main landing gear compartment 46.

In addition to the body 56, the main landing gear compartment 46 comprises ribs 61, which are oriented substantially orthogonally to the longitudinal direction, they are positioned on the outer face F56' of the body 56, and are connected to the body 56. According to one arrangement, the ribs 61 are regularly spaced on a longitudinal plane. The ribs 61 are positioned symmetrically relative to the vertical median plane P.

According to one embodiment, the ribs 61 are made of composite thermoplastic or thermosetting material. The ribs 61 can be produced by different techniques, such as thermoforming for example. The ribs 61 are produced in a single piece.

The ribs 61 are connected to the body 56 by riveting, by welding, or by any other assembly technique.

The ribs 61 make it possible to reinforce the body 56.

According to one characteristic, the ribs 61 extend continuously from the right or left lateral edge 56.5 or 56.6 of the body 56, as far as a longitudinal beam 60. Each rib 61 has a first, straight section 61.1 which is placed against the first part 56.1 of the body 56, and a second, curved section 61.2, placed against a curved portion of the body which extends as far as the right or left lateral edge 56.5 or 56.6 of the body 56.

Figure 10:
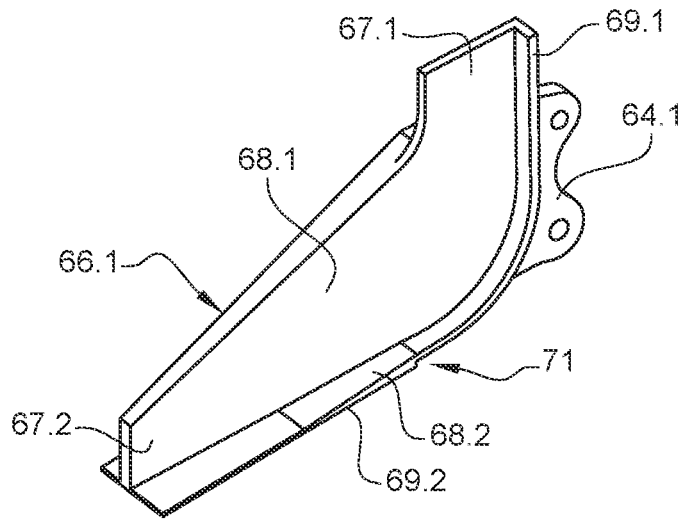
FIG. 10 is a view in perspective of a bolster beam for continuity of the ventral beam, illustrating an embodiment according to the invention.
Figure 11:
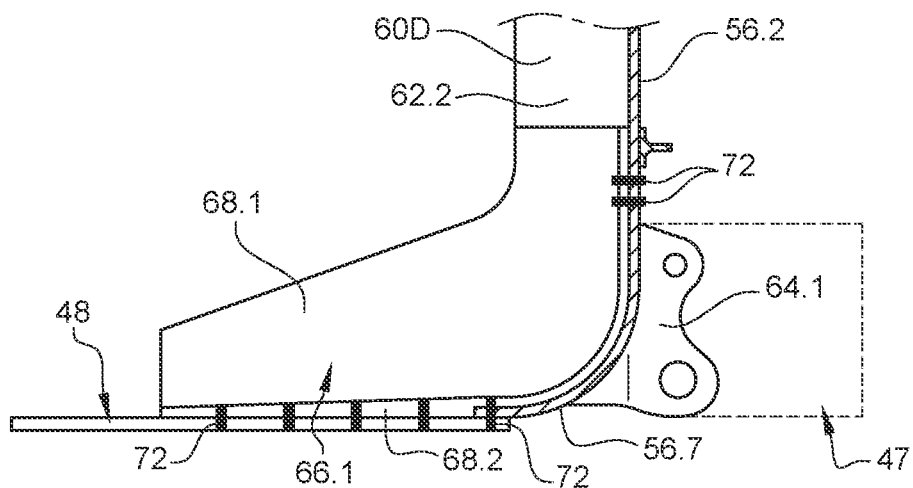
FIG. 11 is a view in cross-section of the bolster beam, shown in FIG. 10, connected to a rear wall of a main landing gear compartment illustrating an embodiment according to the invention.
Figure 12:
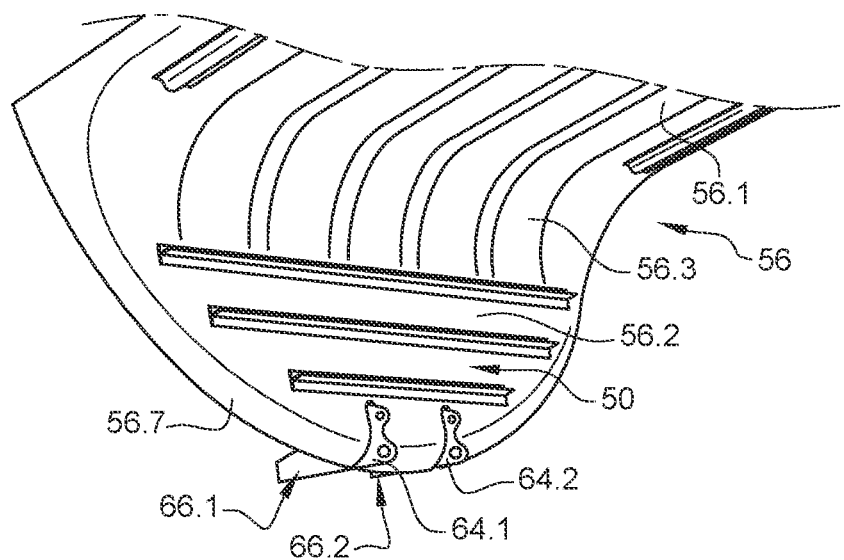
FIG. 12 is a view in perspective of a rear wall of a main landing gear compartment illustrating an embodiment according to the invention.
Figure 13:
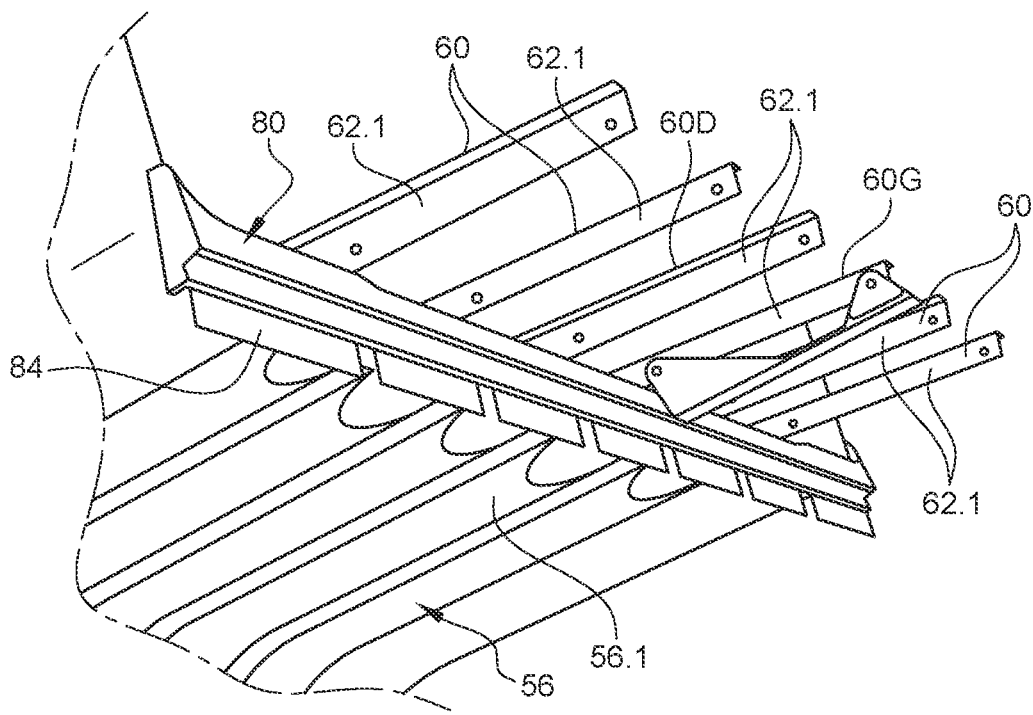
FIG. 13 is a view in perspective of the front of the base wall of a main landing gear compartment illustrating an embodiment according to the invention.

According to an embodiment shown in FIGS. 10 to 12, the main landing gear compartment 46 comprises bolster beams 66.1, 66.2 for continuity of the ventral beam 47. According to one arrangement, the bolster beams 66.1, 66.2 are positioned approximately in line with the right and left longitudinal beams 60D, 60G. The bolster beams 66.1, 66.2 are connected to the ventral beam 47, to the section of fuselage 48, as well as to the body 56.

Each bolster beam 66.1, 66.2 comprises a core 68.1, a sole plate 68.2, and a brace 64.1, 64.2. A bolster beam 66.1, 66.2 is produced in a single piece, and forms a single part. Each bolster beam 66.1, 66.2 has a transverse cross-section in the form of a "C", or a "T", or an "I", or also an "L". The brace 64.1, 64.2 and the core 68.1 of a bolster beam 66.1, 66.2 are positioned on both sides of the sole plate 68.2. The brace 64.1, 64.2 is arranged on the same plane as the core 68.1. The core 68.1 and the sole plate 68.2 are curved.

Each bolster beam 66.1, 66.2 has a first end 67.1 which is connected to the body 56, and a second end 67.2. The bolster beam 66.1, 66.2 is curved between its first and second ends 67.1, 67.2.

According to one configuration, the bolster beams 66.1, 66.2 are secured on the body 56 by means of securing elements 72 such as rivets. According to another configuration, the bolster beams 66.1, 66.2 are secured on the body 56 without securing elements.

For each bolster beam 66.1, 66.2, between its first and second end 67.1, 67.2, the sole plate 68.2 comprises a first part 69.1 which extends from the first end 67.1 of the bolster beam 66.1, 66.2, followed by a second part 69.2 which extends as far as the second end 67.2 of the bolster beam 66.1, 66.2. The first part 69.1 has a substantially constant thickness. The second part 69.2 has a thickness which varies between its end at the junction with the first part 69.1 and the second end 67.2 of the bolster beam 66.1, 66.2. In particular, the thickness of the second part 69.2, at its junction with the first part 69.1, is greater than the thickness of the first part 69.1, and the thickness of the second part 69.2 at the second end 67.2 of the bolster beam 66.1, 66.2 is smaller than the thickness of the first part 69.1. The thickness of the second part 69.2 thus decreases between its end at the junction with the first part 69.1, and its end at the second end 67.2 of the bolster beam 66.1, 66.2. Thus, the sole plate 68.2 has a setback 71.

The body 56 comprises slots 70.1, 70.2 in the vicinity of (near), or at, its rear edge 56.7. The bolster beams 66.1, 66.2, and, in particular, the braces 64.1, 64.2, pass through the slots 70.1, 70.2 of the body 56, such that the braces 64.1, 64.2 are positioned projecting relative to the inner face F56 of the body 56. The bolster beams 66.1, 66.2 are thus positioned supported against the rear edge 56.7 of the body 56. More specifically, the first part 69.1 of the sole plate 68.2 of each bolster beam 66.1, 66.2 has a curved profile, like the rear edge 56.7 of the body 56. The bolster beam 66.1, 66.2 is supported against the body 56, such that the rear edge 56.7 of the body 56 is accommodated in the setback 71 of the bolster beam 66.1, 66.2.

The slots 70.1, 70.2 are offset relative to the right and left longitudinal beams 60D, 60G, such that, when the braces 64.1, 64.2 pass through the slots 70.1, 70.2, the sole plates 68.2 of the bolster beams 66.1, 66.2 are placed against the rear edge 56.7 of the body 56, and the cores 68.1 of the bolster beams 66.1, 66.2 are placed respectively against the right and left longitudinal beams 60D, 60G, and are connected thereto.

According to one configuration, the bolster beams 66.1, 66.2 are connected to the right and left longitudinal beams 60D, 60G without securing elements, and are, for example, welded on the right and left longitudinal beams 60D, 60G, or are co-consolidated with the right and left longitudinal beams 60D, 60G.

The bolster beam 66.1, 66.2 are secured on the ventral beam 47 via the braces 64.1, 64.2. According to one arrangement, the braces 64.1, 64.2 are positioned in the extension of the ventral beam 47, in order to absorb the forces thereof.

The section of fuselage 48 is positioned below the bolster beams 66.1, 66.2, in particular at the second part 69.2 of the sole plate 68.2, and at a part of the first part 69.1 of the sole plate 68.2. A part of the section of fuselage 48 is superimposed on the body 56. Each bolster beam 66.1, 66.2 is secured on the section of fuselage 48, for example by means of securing elements 72, such as rivets. In particular, securing element 72 pass through the section of fuselage 48 as well as the second part 69.2 of the sole plate 68.2, and securing elements 72 pass through the section of fuselage 48, the first part 69.1 of the sole plate 68.2, and the rear edge 56.7 of the body 56. According to another configuration, each bolster beam 66.1, 66.2 is secured on the section of fuselage 48 without securing elements.

Thus, the right and left longitudinal beams 60D and 60G are connected at their second end to the section of fuselage 48, via the bolster beams 66.1, 66.2.

This configuration of the bolster beams 66.1, 66.2 permits a transfer of load between the ventral beam 47 (compression and tension forces), the section of fuselage 48 and the rear edge 56.7 of the body 56.

According to one embodiment, at least the right and left longitudinal beams 60D, 60G extend beyond the front edge 56.4 of the body 56, and each of their first ends 62.1 is connected by a fastener 74 to the central wing spar 44. According to one design, each fastener 74 has a transverse cross-section in the form of a "T", and comprises at least one sole plate 76.1 which is placed against the upper panel 44.2 of the central wing spar 44, and is connected thereto by securing elements 78, as well as at least one core 76.2, which is integral with the sole plate 76.1, and has at least one orifice 76.3. According to one design, the fastener 74 comprises two orifices 76.3. As a complement, for each orifice 76.3, each fastener 74 comprises a connection element which passes through the orifice 76.3 and the right or left longitudinal beam 60D, 60G.

According to one configuration, all the longitudinal beams 60 extend beyond the front edge 56.4 of the body 56, and each of their first ends 62.1 is connected by a fastener 74 as previously described.

Figure 14:
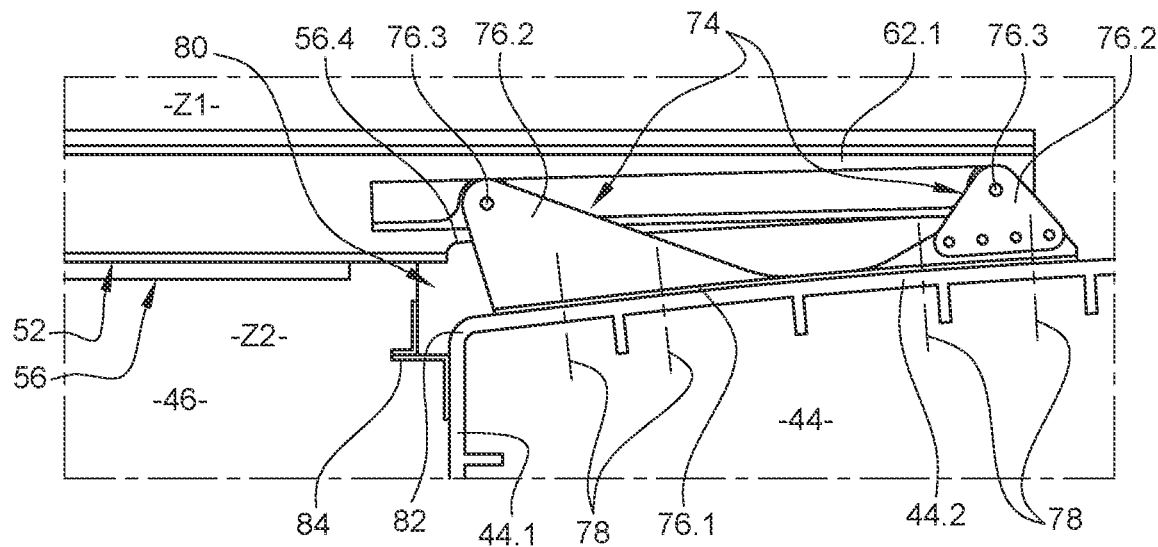
FIG. 14 is a longitudinal cross-section of a connection between a base wall of the main landing gear compartment and a central wing spar illustrating an embodiment according to the invention.

The fact that the first sections 60.1 of the longitudinal beams 60 are straight simplifies the transmission of the forces between the main landing gear compartment 46 and the central wing spar 44. According to this arrangement, the front edge 56.4 of the body 56 is spaced from the central wing spar 44, as illustrated in FIG. 14. In order for it to be sealed, the main landing gear compartment 46 comprises a sealing barrier 80 which extends along the front edge 56.4 of the body 56, i.e., across the width of the body 56 (in the transverse direction).

According to one embodiment, the sealing barrier 80 is distinct from the body 56, and is connected thereto such that, in operation, the sealing barrier 80 is in contact with the joining area 82 of the front and upper panels 44.1, 44.2 of the central wing spar 44.

The sealing barrier 80 has dimensions such as to extend on both sides of the joining area 82.

The central wing spar 44 comprises an angle bar 84 which is configured to maintain the sealing barrier 80 placed against the front panel 44.1 of the central wing spar 44, and against the inner face of the body 56, at the front edge 56.4 of the body 56.

According to one configuration, the sealing barrier 80 is an inflatable tube which is pressurized in operation, for example due to a pressurizing system of a cabin of the aircraft. According to another configuration, the sealing barrier 80 is a rigid seal.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising a fuselage with a longitudinal direction as well as a vertical median plane, and comprising, from the front to the rear,
   a central wing spar,
   a main landing gear compartment,
   a section of the fuselage,
      the main landing gear compartment comprising
         a rear transverse wall connected to the section of fuselage which is positioned at the rear of the main landing gear compartment,
         a base wall which is connected to the central wing spar,
         the rear transverse wall and the base wall forming a sealed barrier between a first, pressurized area and a second, non-pressurized area,
      the aircraft comprising a ventral beam which passes through the main landing gear compartment;
      wherein the main landing gear compartment comprises:
         a body, produced in a single piece from composite material, separating the first, pressurized area and the second, non-pressurized area, said body comprising
            a first part corresponding to the base wall,
            a second part corresponding to the rear transverse wall,
            an inner face which is oriented towards the second, non-pressurized area, and
            an outer face which is oriented towards the first, pressurized area;
         at least two longitudinal beams made of composite material, at least in part oriented parallel to the longitudinal direction and connected to the body; and
         bolster beams which assure a continuity of the ventral beam, the bolster beams being positioned in-line with the longitudinal beams, and being connected to the ventral beam, to the section of fuselage, as well as to the body.

2. The aircraft as claimed in claim 1, wherein the body comprises a third, curved part connecting the first and second parts.

3. The aircraft as claimed in claim 2,
   wherein the base wall comprises a front edge which is contiguous with the central wing spar, and the rear transverse wall comprises a rear edge which is contiguous with the section of fuselage positioned at the rear of the main landing gear compartment, and
   wherein the longitudinal beams, known as right and left longitudinal beams, are positioned on both sides of the vertical median plane, on the outer face of the body, and each have a first straight section which is placed against the first part of the body, a second straight section which is placed against the second part of the body, and a third section connecting the first and second sections, which third section is curved and is placed against the third, curved part of the body.

4. The aircraft as claimed in claim 3, wherein the right and left longitudinal beams each have a first end which is connected to the central wing spar, and a second end which is connected to the section of fuselage positioned at the rear of the main landing gear compartment, the right and left longitudinal beams being continuous between the first and second ends.

5. An aircraft comprising a fuselage with a longitudinal direction as well as a vertical median plane and comprising, from the front to the rear,
   a central wing spar,
   a main landing gear compartment,
   a section of the fuselage,
      the main landing gear compartment comprising
         a rear transverse wall connected to the section of fuselage which is positioned at the rear of the main landing gear compartment,
         a base wall which is connected to the central wing spar,
         the rear transverse wall and the base wall forming a sealed barrier between a first, pressurized area and a second, non-pressurized area,
      the aircraft comprising a ventral beam which passes through the main landing gear compartment;
      wherein the main landing gear compartment comprises:
         a body, produced in a single piece from composite material, separating the first, pressurized area and the second, non-pressurized area, said body comprising
            a first part corresponding to the base wall,
            a second part corresponding to the rear transverse wall,
            an inner face which is oriented towards the second, non-pressurized area, and
            an outer face which is oriented towards the first, pressurized area;
         at least two longitudinal beams made of composite material, at least in part oriented parallel to the longitudinal direction and connected to the body; and
         bolster beams which assure a continuity of the ventral beam, the bolster beams being positioned in-line with the longitudinal beams, and being connected to the ventral beam, to the section of fuselage, as well as to the body,
   wherein the body comprises a third, curved part connecting the first and second parts,
   wherein the base wall comprises a front edge which is contiguous with the central wing spar, and the rear transverse wall comprises a rear edge which is contiguous with the section of fuselage positioned at the rear of the main landing gear compartment,
   wherein the longitudinal beams, known as right and left longitudinal beams, are positioned on both sides of the vertical median plane, on the outer face of the body, and each have a first straight section which is placed against the first part of the body, a second straight section which is placed against the second part of the body, and a third section connecting the first and second sections, which third section is curved and is placed against the third, curved part of the body,
   wherein the right and left longitudinal beams each have a first end which is connected to the central wing spar, and a second end which is connected to the section of fuselage positioned at the rear of the main landing gear compartment, the right and left longitudinal beams being continuous between the first and second ends, wherein each bolster beam comprises a brace, and wherein the body comprises slots which are in at or near a rear edge of the body, each brace passing through a slot, such that the braces project relative to the inner face of the body, and the bolster beams are positioned supported against the rear edge of the body.

6. The aircraft as claimed in claim 5, wherein each bolster beam comprises a core and a sole plate, for each bolster beam the brace and the core being positioned on both sides of the sole plate, and wherein the slots are positioned relative to the right and left longitudinal beams such that, when the braces pass through the slots, the sole plates are placed against the rear edge of the body, and the cores are placed respectively against the right and left longitudinal beams, and are connected thereto.

7. The aircraft as claimed in claim 4, wherein at least the right and left longitudinal beams extend beyond the front edge of the body, each of their first ends being connected by a fastener to the central wing spar.

8. An aircraft comprising a fuselage with a longitudinal direction as well as a vertical median plane, and comprising, from the front to the rear, a central wing spar, a main landing gear compartment, a section of the fuselage, the main landing gear compartment comprising a rear transverse wall connected to the section of fuselage which is positioned at the rear of the main landing gear compartment, a base wall which is connected to the central wing spar, the rear transverse wall and the base wall forming a sealed barrier between a first, pressurized area and a second, non-pressurized area, the aircraft comprising a ventral beam which passes through the main landing gear compartment;

wherein the main landing gear compartment comprises:

a body, produced in a single piece from composite material, separating the first, pressurized area and the second, non-pressurized area, said body comprising a first part corresponding to the base wall, a second part corresponding to the rear transverse wall, an inner face which is oriented towards the second, non-pressurized area, and an outer face which is oriented towards the first, pressurized area;

at least two longitudinal beams made of composite material, at least in part oriented parallel to the longitudinal direction and connected to the body; and bolster beams which assure a continuity of the ventral beam, the bolster beams being positioned in-line with the longitudinal beams, and being connected to the ventral beam, to the section of fuselage, as well as to the body, wherein the body comprises a third, curved part connecting the first and second parts, wherein the base wall comprises a front edge which is contiguous with the central wing spar, and the rear transverse wall comprises a rear edge which is contiguous with the section of fuselage positioned at the rear of the main landing gear compartment, wherein the longitudinal beams, known as right and left longitudinal beams, are positioned on both sides of the vertical median plane, on the outer face of the body, and each have a first straight section which is placed against the first part of the body, a second straight section which is placed against the second part of the body, and a third section connecting the first and second sections, which third section is curved and is placed against the third, curved part of the body, wherein the right and left longitudinal beams each have a first end which is connected to the central wing spar, and a second end which is connected to the section of fuselage positioned at the rear of the main landing gear compartment, the right and left longitudinal beams being continuous between the first and second ends, wherein at least the right and left longitudinal beams extend beyond the front edge of the body, each of their first ends being connected by a fastener to the central wing spar, wherein each fastener comprises:

at least one sole plate which is placed against the central wing spar and is connected thereto by securing elements;

at least one core which is integral with the sole plate, and is provided with at least one orifice; and a connection element for each orifice, passing through said orifice and the right or left longitudinal beam.

9. The aircraft as claimed in claim 7, wherein the main landing gear compartment comprises a sealing barrier which extends along the front edge of the body, said sealing barrier being integral with the body and in contact with the central wing spar.

10. The aircraft as claimed in claim 9, wherein the central wing spar comprises an angle bar which is configured to maintain the sealing barrier placed against the central wing spar and the inner face of the body, at the front edge of the body.

* * * * *